United States Patent [19]

Mosch

[11] 3,828,434
[45] Aug. 13, 1974

[54] MIXING CAPSULE
[76] Inventor: Wolfgang Mosch, Wengengasse 29, 79 Ulm, Danube, Germany
[22] Filed: Jan. 27, 1970
[21] Appl. No.: 6,221

[30] Foreign Application Priority Data
Feb. 1, 1969 Germany.............................. 1904963

[52] U.S. Cl. .................................................. 32/60
[51] Int. Cl. ............................................. A61c 5/04
[58] Field of Search .................................. 32/60, 69

[56] References Cited
UNITED STATES PATENTS
1,188,417  6/1916  Dalbey................................... 32/60
3,368,592  2/1968  Thiel et al............................... 32/60
3,521,356  7/1970  Newman.................................. 32/60

Primary Examiner—Robert Peshock
Attorney, Agent, or Firm—Spencer & Kaye

[57] ABSTRACT

A capsule for dental amalgam is provided with an internal piston for dispensing amalgam and is provided with means for attaching the capsule to a delivery means for advancing the piston; the other end may have a break-off closure.

9 Claims, 10 Drawing Figures

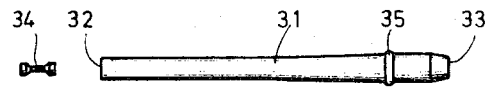
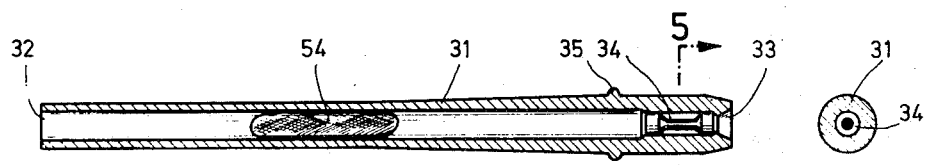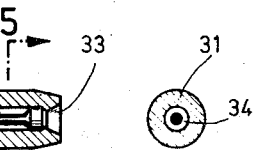
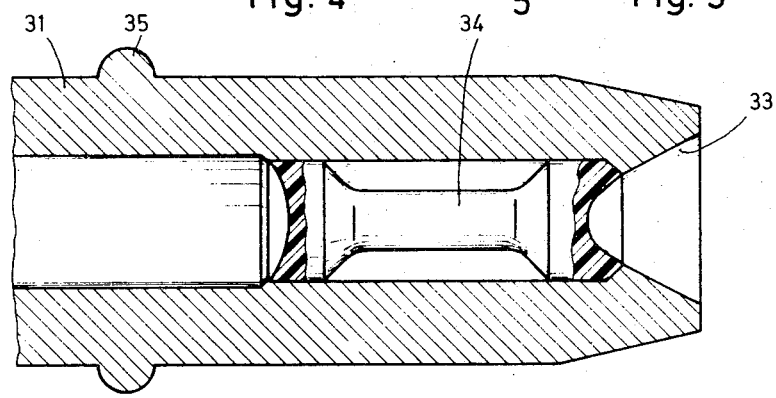
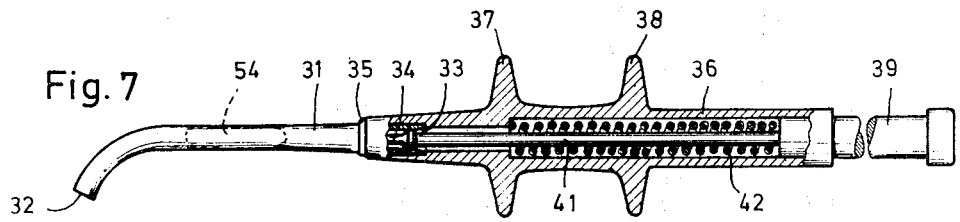
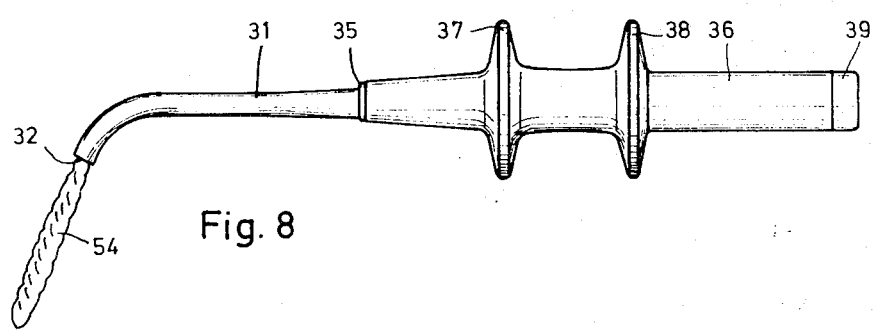

MIXING CAPSULE

The invention relates to a mixing capsule for the mixing of substances which are used for the filling of cavities in teeth.

For the preparation of amalgam pastes in dental practice, dosing and mixing devices have been known where mercury and amalgam fillings in dosed quantities are inserted in a mixing capsule and are mixed intimately in this capsule through vibration or shaking to malleable and homogeneous paste in the shape of a small lump of amalgam. After removing the mixing capsule from the device, the little lump must be taken from the capsule by hand, must be placed on a filling instrument, such as a filling gun or an amalgam obturator, and subsequently must be pressed into the cavity of the tooth. This is a cumbersome, difficult and time consuming process in which the extraction of the lump of the amalgam from the mixing capsule and the placing of it onto the amalgam bearer is carried out in most cases by a dental assistant. Besides, the mixing capsules and instruments used must be cleaned and sterilized again and again.

Furthermore, mixing capsules are known where the substances that are to be mixed are kept initially in the capsule, and when needed are mixed by piercing of a thin wall separating these substances to be mixed together by a shaking of the capsule by machine. Here too the mixed substance, for example amalgam dental cement or some other mixture, must in most instances be removed from the capsule by an assistant, must be placed on the the filling instrument and handed to the dentist, which is a cumbersome, time consuming process requiring a certain dexterity.

The invention has the object of eliminating the deficiencies inherent in the known mixing capsules, especially of eliminating the process of removal of the mixed substance by hand from the capsule and placing it onto a filling instrument.

According to the invention the task will be solved by providing the capsule with two removable closures at its ends, and, after opening of the closures, that one end of the capsule can be connected with a removing device, in such a manner that upon operation of the removing device the mixed filler substance can be placed directly into the cavity from the free end of the capsule.

In the case of a preferred design of the invention, the mixing capsule has been formed as a small cylindrical tube with an inside diameter between about 1 and 4 mm. Advantageously, at least one end closure is designed as a break-off closure. In this case of need, the capsule according to the invention may have an additional opening for insertion of the dosed quantities of substances that are to be mixed. It is advantageous if one end closure is formed as a piston which can be pushed forward by the removal device. Finally, it will still be of advantage to design the capsule in such a manner that it can be connected with a commercial mixing device producing vibrations.

The subsequent description of preferred designs of the invention in connection with the attached drawing serves for a further explanation.

FIG. 3 shows a mixing capsule according to the invention with a piston;

FIG. 4 shows an axial section of the mixing capsule of FIG. 3 with an inserted piston;

FIG. 5 shows a cross section along the line 5 — 5 in FIG. 4;

FIG. 6 is an enlarged view of a partial section of the mixing capsule;

FIG. 7 is a mixing capsule connected with a delivery device according to the invention;

FIG. 8 shows the delivery device of FIG. 7 with the filler substance squeezed out;

Figure 1:
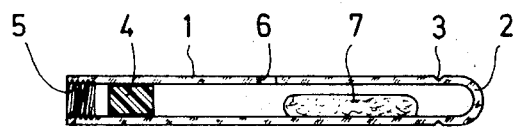
FIG. 1 shows a preferred design of a mixing capsule according to the invention and FIG. 2 shows a removal device to be connected with the capsule of FIG. 1.

The mixing capsule shown in FIG. 1 consists of a thin elongated small tube 1 made of glass, plastic, metal or something similar, of a length between about 2 and 8 cm and with an inside diameter between 1 and 4 mm. Preferred dimensions are: length about 6 cm, inside diameter about 2.5 mm. The small tube 1 has an end arrangement in the shape of a cap 2 which can be broken off the actual body of the tube on one front side (on the right in FIG. 1), which cap is separated from the cylindrical tube body by a notch 3. On the front side of the small tube 1 opposite the cap 2 a plug 4 made of plastic is pressed into the small tube as a terminal closure, in such a manner that upon exertion of a certain force it can be moved like a piston in the small tube 1. The extreme end of the small tube 1, adjoining the pulg 4, is provided with an inside thread 5. Finally, in the case of the design according to FIG. 1, an inlet opening 6 may also be provided for the substances that are to be mixed.

Figure 2:
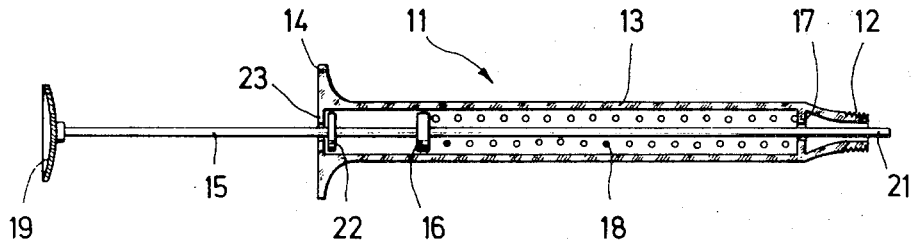

FIG. 2 shows (merely as an example) a delivery device 11 which can be connected with the mixing capsule shown in FIG. 1. For this purpose, the delivery device 11 has one end with an outside thread 12, onto which the small tube 1 can be screwed on by means of its inside thread 5. The delivery device 11 has a delivery rod 15 in an essentially cylindrical housing 13 with an end flange 14, which rod is pretensioned by a spiral spring 18 inserted between one shoulder 16 of the rod 15 and a shoulder 17 of the housing 13 projecting inwardly, in such a way that a knob 19 connected with the rod 15 extends out of the housing 13, whereby the front end 21 of the rod 15 projects by a small amount beyond the end of the housing 13 provided with the thread 12. At the same time a stop 22 connected with the rod 15 abuts on the inside of a front wall 23 of the housing 13. The delivery device is held in the customary manner — about like a cigar — between the index finger lying against the flange 14 and the middle finger of one hand pressed with the thumb of the hand against the knob 19, so that the end 21 of the rod 15 can be pushed out of the housing.

The mixing capsule according to the invention and according to FIG. 1 is operated as follows: First of all the substances to be mixed, for example silver fillings and mercury, are inserted through the inlet opening 6 into a small tube 1 and are mixed through vigorous shaking. This takes place in a simple manner by connecting the small tube 1 with a commercial dosing and mixing device, so that the substances to be mixed enter into the small tube and are mixed subsequently there through vibration. In this manner a small elongated amalgam lump 7 will develop in the mixing capsule, which is shown in FIG. 1. Now the capsule is removed from the mixing device, the cap 2 at the end is broken off at the notch 3 and the tube is screwed with its inside thread 5 onto the outside thread 12 of the delivery device 11. Subsequently the small tube 1, connected with the delivery device 11, is brought into the vicinity of the cavity that is to be filled and by pressing in the delivery rod 15, whose forward end 21 pushes the plug 4 forward in the tube 1, the lump 7 is pressed directly into the cavity. Subsequently, the tube 1 is removed from the delivery device 11 and is thrown away. In this manner it is possible to eliminate the process of manual removal of the mixed amalgam from the mixing capsule, the manual application onto a filling instrument, as well as the cleaning of the mixing capsule.

The mixing capsule shown in FIG. 1 can be modified in several ways. The substances that are to be mixed, for example a dental cement with the pertinent mixing liquid, may be initially disposed in the capsule and may be separated in a known manner by a foil or something similar which is to be pierced prior to mixing. In that case the inlet opening 6 is unnecessary and it will suffice to connect the capsule after uniting the substances that are to be mixed, with a mixing device producing vibrations.

The connection of the mixing capsule with the delivery device can be accomplished also by a bayonet catch; by a simple slip-on connection or something similar, instead of by a thread. The plug 4 may be omitted if the end of the mixing capsule next to it is closed in some other manner, for example also by a cap similar to cap 2 that can be broken off. In that case a piston-like element will be required at the end 21 of the delivery rod 15, in order to squeeze out the mixed substance 7 from the free end of the capsule after the cap has been broken off.

Also, the delivery device shown in FIG. 2 can be made in some other manner, without thereby limiting the ideas on which the invention is based. Especially, this device can be designed in such a way that, through a reciprocating movement of the knob 19, the end 21 of the rod 15 will be pushed out of the housing 13 each time by a predetermined distance in the same direction. In this manner a dosed delivery of the mixed substance from the mixing capsule is possible.

The inlet opening 6 of the mixing capsule according to FIG. 1 can be omitted even if the substances which are to be mixed are introduced through the opening of the tube 1, which in FIG. 1 is closed by the plug 4. In that case care has to be taken merely that during the mixing of the substances this opening will be temporarily closed, for example by a member provided on the mixing device.

The connection of the mixing capsule with the element of the mixing device executing vibrations of shaking movements can be made in the simplest manner by clamping or gripping. If need be, it will also be possible to make provisions on the mixing capsule itself, for example, to make a bead or a depression, in order to facilitate the attachment to the mixing device.

As becomes clear from FIGS. 3 to 6, a mixing capsule 31 according to the invention has the shape of a small tube with a cylindrical inside space, one of its ends 32 (in FIG. 4 on the left-hand side) being constantly open, while the other end 33 (in FIG. 4 on the right-hand side) is closed by a slidable, dumbbell-shaped piston 34 made preferably of slightly resilient material.

As can be seen especially from FIG. 6, the small tube at the end 33 on the piston side has a slightly smaller inside diameter than the remainder of the tube. In this area with the smaller inside diameter, the piston 34 is kept in a press fit, so that a certain force is required to push it forward in the direction of the area of the tube having a larger inside diameter. As soon as the piston 34 has moved to the area of the small tube having a larger inside diameter, it can be pushed forward easily.

The outside diameter of the mixing capsule 31, as can be seen from FIG. 4, gradually increases in the direction of the of the end on the piston side, so that the thickness of the wall gradually increases while the inside diameter remains the same. In the vicinity of the end near the piston, the small tube has a bead 35, the purpose of which will be explained subsequently.

In FIGS. 7 and 8 a simple delivery device is illustrated. In a cylindrical housing 36 with two plate-shaped enlargements 37 and 38, for the purpose of grasping it with one's fingers. a piston 39 is slidably mounted. The piston 39, at the end of which a flexible, rod 41, made for example of steel wire or plastic, is attached, which is pretensioned by a spiral spring 42 in the withdrawn position shown in FIG. 7. Into the end of the housing 36 opposite from the piston 39, a mixing capsule 31 according to the invention is inserted, which corresponds to the small tube according to FIGS. 3 to 6, with the sole difference being that it is curved at its free end 32. The mixing capsule is inserted in the housing 36 to a position such that the bead 35 abuts on the front side of the housing. Mixing capsule 31, piston 34 and the delivery device are made preferably of plastic, for example extruded. Instead of the bead 35, a furrow or groove running circularly around it could also be provided on the mixing capsule 31, into which groove a bead inwardly protruding provided on the plug-in opening of the delivery device could snap in whenever the capsule 31 is plugged into the delivery device.

Figure 9:
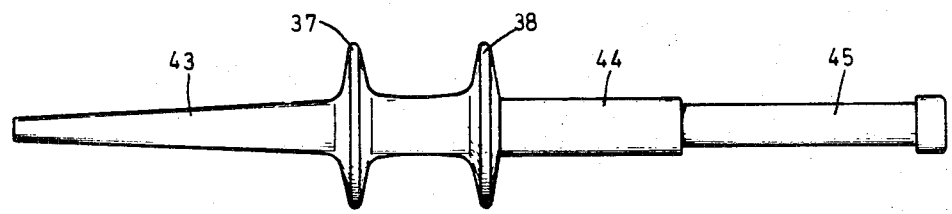
FIG. 9 is a mixing capsule according to the invention formed in one integral unit with a delivery device and FIG. 10 is a sectional view of a vibrating filling device for the mixing capsule according to the invention.

FIG. 9 shows another preferred design of a mixing capsule according to the invention where the mixing capsule 31, in the shape of a small tube and formed as a separate assembly element in the FIGS. 3 to 8, is permanently connected, for example as one piece with the delivery device. In that case the front part 43 of the structure shown in FIG. 9 corresponds to the mixing capsule 31 in FIGS. 4 and 7, while the rear element 44 has the function of the delivery device. The slidable piston is designated by 45. In the case of this design of the invention, the space serving for the mixing of the filler substance does not need to be limited merely to the area of the small tube according to FIG. 4 or 7, but may extend even partly into the actual delivery device, that is, into the part 44.

Figure 10:
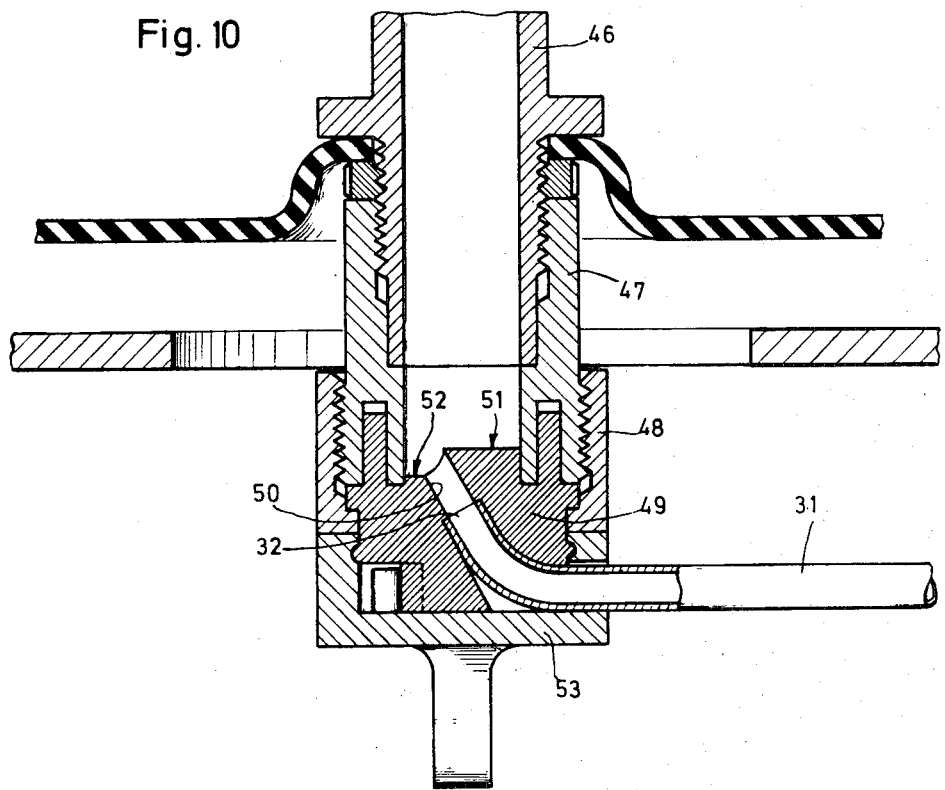

With the mixing capsules according to the invention, they operate in the following manner. First of all, the components of the filler substance must be inserted in the mixing capsule and must then be mixed therein, which takes place through shaking in a manner known per se. FIG. 10 shows the outlet connection 46 of a shaking device known per se. The connection 46 is subjected by a mechanism (not shown) to a reciprocating, rotating or other type of vibratory movement. A filler element 49 with a bore 50 that runs slantingly downwards and expands in a stepped shape is held on the connection 46 by a screw member 47 and a screw ring 48. The filler element 49 has a stepped bottom whose varying levels are designated by 51 and 52. The open end of a mixing capsule 31 (in the case shown it is curved) is plugged into the slanting bore and is held for example by means of a snap element closure element 53. Now the connection 46 is made to vibrate and the desired, precisely measured quantity of the components of the filling substances to be mixed, for example silver fillings and mercury, are inserted on the bottom of the filler element 49 through its inside bore. On the basis of the effect of gravitation, the inserted components will strive in the course of the vibration movements of the entire arrangement to always reach the lowest level of the filler element 49 and, finally, to reach the mixing capsule 31 via the slanting bore 50. An undesirable backward movement in the opposite direction is impossible because of the stepped down levels 51 and 52 and because of the slanting course of the bore 50. Since the mixing capsule is connected rigidly with the vibrating connection, it too is shaken, so that the components of the filler substance which have reached it are mixed intimately and form a small lump 54, which is shown in FIGS. 4, 7 and 8.

After the mixing has been completed, the mixing capsule 31 is removed from the filler element 49 and it is connected with the delivery device with the end on the piston side, as shown in FIG. 7. Then, by pushing in the piston 39, any desired quantity of the filler substances — see FIG. 8 — can be pressed into the cavity of the tooth.

The mixing capsule shown in FIG. 9 according to the invention is used in an analogous manner. In that case, however, not only the mixing capsule is inserted into the filler element 49 of FIG. 10, but the entire tool shown in FIG. 9.

After delivery of the filler substance, in the case of FIGS. 3 to FIG. 8, only the mixing capsule 1 will be thrown away and in the case of FIG. 9 the entire device consisting of parts 43, 44 and 45, will be discarded after each use.

Other modifications and improvements may be made in the invention by those skilled in the art which would come within the scope of the annexed claims.

I claim:

1. In capsule means for mixing and dispensing a toothfiller consisting of at least two substances, the combination comprising an elongated integral combined mixing and dispensing capsule means of tubular form, having an inner mixing chamber provided with a removable end, means for enabling dosed quantities of each of said substances to be introduced into said capsule means, a vibratory mixing device having means for connection with said capsule means to mix said substances in the mixing chamber of said combined mixing and dispensing capsule means thereby to form the tooth-filler, said capsule means also being provided with means for cooperation with a delivery means for enabling the tooth-filler to be introduced from said capsule means directly into the cavity of a tooth, whereby said substances can be introduced into said capsule means, be mixed therein, and be dispensed therefrom by said delivery means from one end of said mixing chamber directly into the cavity of the tooth.

2. The invention defined in claim 1, wherein the other end of said capsule is provided with means for attachment to said delivery means.

3. The invention defined in claim 1, wherein the inside diameter of said capsule may vary between the limits of 1 and 4 mm.

4. The invention defined in claim 1, wherein said removable closure is defined by a weakened area to permit a closed end portion of the capsule to be broken off.

5. The invention defined in claim 2, wherein said capsule means is provided with a closure means comprising a piston means movable by said delivery means to dispense said substances.

6. The invention defined in claim 1, wherein said capsule means comprises an elongated tube open at both ends, and closure means for one of said open ends comprising a slidable piston retained within the tube, said tube also being provided with means for connection with delivery means for moving the piston to dispense said substances from the other open end.

7. The invention defined in claim 6, wherein the inside diameter of said tube is reduced at said one end and said piston is made of resilient material whereby the piston is retained under compression at said one end.

8. The invention defined in claim 6, wherein the open dispensing end of the tube is angularly curved with respect to the remainder of the tube.

9. The invention defined in claim 6, wherein said elongated tube and delivery means are joined as an integral unit.

* * * * *

UNITED STATES PATENT OFFICE
CERTIFICATE OF CORRECTION

Patent No. 3,828,434    Dated August 13th, 1974

Inventor(s) Wolfgang Mösch

It is certified that error appears in the above-identified patent and that said Letters Patent are hereby corrected as shown below:

In the heading of the patent, after line 7, insert
--July 26, 1969    Germany ........ 1938028--;

Column 3, line 57, after "vibrations" change "of" to --or--;

Column 4, line 23, change "fingers." to --fingers,--.

Signed and sealed this 26th day of November 1974.

(SEAL)
Attest:

McCOY M. GIBSON JR.         C. MARSHALL DANN
Attesting Officer           Commissioner of Patents